Sept. 10, 1968

J. E. BURWELL 3,401,217

METHOD OF MOLDING A FOAM CUSHION
HAVING SEAM GROOVES
Filed July 2, 1963

INVENTOR.
JEROME E. BURWELL
BY
*J. B. Holden*
ATTORNEY

United States Patent Office 3,401,217
Patented Sept. 10, 1968

3,401,217
METHOD OF MOLDING A FOAM CUSHION HAVING SEAM GROOVES
Jerome E. Burwell, Akron, Ohio, assignor to The Goodyear Tire & Rubber Company, Akron, Ohio, a corporation of Ohio
Filed July 2, 1963, Ser. No. 292,303
2 Claims. (Cl. 264—45)

ABSTRACT OF THE DISCLOSURE

This invention relates to a method of molding in one operation a polyurethane foamed cushion having seam grooves by providing reinforcing fabric strips juxtapositioned over a mold gate so that when the mold is closed the fabric strip will rest over the mold gate charging the mold cavity with a polyurethane foamable mixture and allowing the mixture to adhere to fabric strips to the foamed seat cushion over the grooves.

---

This invention relates to an improved method of manufacturing an elastomeric cushion. In particular, the present invention relates to the manufacture of a multipart polyurethane foam cushion formed as an integral unit. The invention also relates to the method whereby the cushion is formed by a single molding technique.

In the past, seat cushions for use with chairs, benches, car seats, etc., have been produced with foam rubber originating from latex formulations well-known in the art. Foam rubber has been replaced quite appreciably with polyurethane foam because of its extraordinary cushioning characteristics coupled with its ability to withstand oxidation and ultraviolet radiation. The polyurethane foam cushions have been accepted in the automobile industry as the cushioning medium utilized in the seat structure. Polyurethane is ideally suited to form the curved seat structure of "bucket seats" or body contoured seats. In the design of contoured automobile seats, indentations or grooves are formed in the surfaces of the seat to accommodate the rather bulky seams that result from structurally acceptable coupling of leather or similar plastic seat covering.

Heretofore, the grooves for the seat upholstering seams have been provided for by forming the polyurethane seat cushion in separate pieces, then bonding the components together by an interconnecting strip of paper or fabric cloth. Another method attempted to produce an integral foam cushion was to mold a relatively thin interconnecting foam bridge between the primary cushion sections, thus providing a deep groove for containing the recessed seams of the cushion covering.

It is an object of the present invention to provide a multipart polyurethane foam cushion formed as an integral part that is the result of a single molding.

An additional object of the present invention is to provide a polyurethane foam cushion interconnected by fabric strips adhered to the foam without the assistance of additional adhesives.

Another object of this invention is to produce a polyurethane foam cushion by a method that results in a complete sectionalized cushion formed by a single molding.

Figure 1:
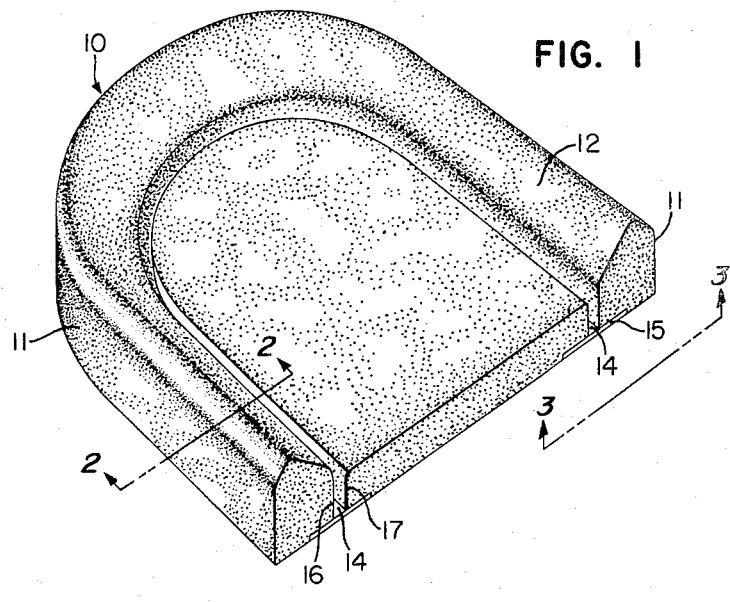
Figure 2:
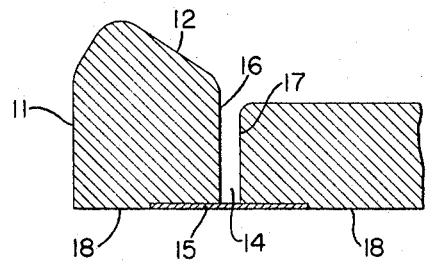
Figure 3:
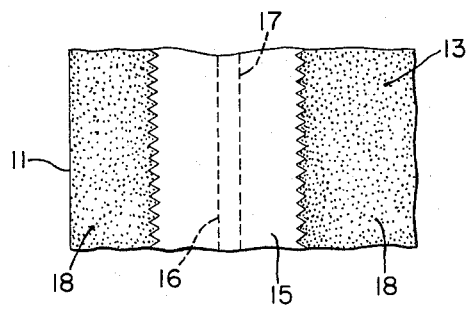

Still other objects and advantages will be apparent from the following description of this invention when considered together with the accompanying drawings wherein the preferred embodiment of the present invention is clearly shown. In the drawings, FIG. 1 shows a pictorial representation of a typical automobile "bucket seat." FIG. 2 is a sectional view taken along the lines 2–2 of FIG. 1 and showing the seam-accommodating groove. FIG. 3 is a partial bottom view taken along lines 3–3 of FIG. 1 and showing the fabric coupling strip bonded into final position.

As has been mentioned previously, the fabrication of polyurethane foam seat cushions has presented a problem, especially when deep seam grooves are required. Cushions have been assembled by forming the exterior thicker edge portions of the cushion and joining it with a thin seat portion that has been stamped from foam sheet stock. This procedure not only requires more labor, but also a higher rate of scrap material is inherent in the stamping of irregular configurations from the sheet stock. Additionally, an adhesive must be applied to either the foam or the interconnecting fabric material. It is also necessary to jig the assembled parts to insure conformity in overall dimensions. All of the above set forth steps require additional time and space in order to arrive at a satisfactory finished product. Rather than manufacture a cushion from separate parts, the cushion has been molded with an interconnecting foam strip. At first, this would appear to be an ideal method of coupling the various seat cushion sections and at the same time provide a deep seam groove. In practicing this method, a mold is formed by having a gate or partition that does not span the entire distance from the bottom to top of the mold. Therefore, when the mold cavity is completely filled with the expanded foam, an interconnecting web will tie the cushion sections together. In charging a multi-cavity mold as described above, a measured quantity of foam mixture is placed within the mold cavity. The foam then expands and flows over the incomplete gate, thus forming the interconnecting web. In so doing, "splits" or "shears" are produced along the webbed structure, thus causing an inadequate interconnection between the component cushion sections. It has also been discovered that an interconnecting foam web as discussed supra is difficult to sew through in that the needle has a tendency to clog; furthermore, the composite thread chain does not draw down in the proper manner as when the fabric alone is sewed in conjunction with the upholstery material.

FIG. 1 shows a typical "bucket seat" fabricated from a foam material such as polyurethane foam. The entire seat is shown at 10. The exterior or raised edge section is shown at 11. Tapered wall 12 forms the contour section that lies adjacent central section 13. A seam-accommodating groove 14 separates edge section 11 from central section 13. A groove such as 14 is maintained by fabric strip 15. FIG. 2 is a cross sectional view taken along lines 2—2 of FIG. 1 and shows a raised edge section 11 located relative to central section 13. A groove 14 is formed by slightly tapered walls 16 and 17, which are the parting surfaces formed by the gate which is, of course, a part of the mold (not shown). Fabric strip 15 is shown as the sole interconnection between cushion sections 11 and 13. FIG. 3 shows a bottom section of the cushion as viewed along lines 3—3 of FIG. 1. The exterior 16 of fabric strip 15 is flush with the adjacent surfaces 18 of the foam sections.

In practicing the invention, fabric strips of osnaburg fabric or other suitable netting is temporarily affixed to the top inside of the cushion mold. The fabric can be held in position against the mold surface by pins or making tape. A typical polyurethane foam mixture, as described in U.S. Patent 2,785,739, is poured into the mold cavities. Of course, a person skilled in the art will recognize that polyether polyols could be used in place of polyesters as set forth in the above enumerated patent. The top portion of the mold is closed and the already positioned fabric becomes positioned opposite the full height gate within the bottom section of the mold. The foam expands the full height of the cavity and firmly presses against fabric 15. The polyurethane foam is securely bonded to the surface of the fabric 15 by the inherent adhesive qualities of the uncured polyurethane mixture.

It can be seen that the various components of the cushion are tied together in proper spaced apart relationship in a single molding step. The use of additional adhesives which can add stiffness to the interconnecting joint are entirely eliminated.

An additional benefit of the integrally cured fabric strip is that stripping of the cured cushion from the mold is enhanced. The fabric acts as a reinforcing member, thus distributing the loan required for removal of the easily deformed hot cushion from the mold.

The aforedescribed improved foam seat cushion provides a deeper seam groove for the accommodation of French seamed upholstery material and also completely eliminates the problem of sewing through an interconnecting web of foam material. The bond between the in situ connection of foam to fabric produces a joint that does not have a tendency to come loose as in prior bonding methods.

While certain representative embodiments and details have been shown for the purpose of illustrating the invention, it will be apparent to those skilled in this art that various changes and modifications may be made therein without departing from the spirit or scope of the invention.

I claim:

1. The method of molding in one operation a foam cushion having seam grooves therein, the steps comprising
    (1) positioning at least one reinforcing strip to the inside surface the top portion of a multi-cavity mold so that said strip is adjacent a mold gate therein;
    (2) charging the mold cavities with a foamable mixture;
    (3) closing the mold and permitting said foamable mixture to expand, thus forcing said reinforcing strip firmly against said mold surface;
    (4) curing the expanded foam cushion so as to permit firm bonding by the natural adhesive characteristics of the foam mixture between the foam and reinforcing strip; and
    (5) stripping the completed integral foam cushion from the mold.

2. The method of molding in one operation a polyurethane foam cushion having seam grooves comprising
    (1) temporarily affixing at least one reinforcing fabric strip to the inside surface of a multi-cavity mold so that each strip is juxtapositioned over a mold gate when the mold is closed;
    (2) charging the mold cavities with a polyurethane foamable mixture;
    (3) closing the mold to bring each strip into juxtaposition relative to its corresponding mold gate;
    (4) permitting the polyurethane foamable mixture to foam and fill the mold to bring each strip into contact with the polyurethane foam while in its adhesive condition to adhere the strip to the foam;
    (5) curing the foam; and
    (6) opening the mold and stripping from the mold the completed integral foam cushion with a fabric strip adhered over the seam groove.

References Cited

UNITED STATES PATENTS

| | | |
|---|---|---|
| 2,921,403 | 1/1960 | Cunnington. |
| 3,142,073 | 7/1964 | Stern _____ 5—354 |

FOREIGN PATENTS

| | | |
|---|---|---|
| 692,123 | 5/1953 | Great Britain. |

JAMES A. SEIDLECK, *Primary Examiner.*

P. E. ANDERSON, *Assistant Examiner.*